United States Patent [19]
Thakur et al.

[11] Patent Number: 5,313,738
[45] Date of Patent: May 24, 1994

[54] CLOSURE FOR DOORS USED WITH SMALL AND MEDIUM SIZED PRESSURE VESSELS

[75] Inventors: Bhabesh K. Thakur, Henrietta; Maurice Gilbert, Canaseraga; Charles O. Hancock, Fairport; Charles H. Feathers, Hilton, all of N.Y.

[73] Assignee: MDT Corporation, Torrance, Calif.

[21] Appl. No.: 644,086

[22] Filed: Jan. 22, 1991

[51] Int. Cl.⁵ ............................................. E05B 65/06
[52] U.S. Cl. .................................... 49/394; 292/241
[58] Field of Search ............... 49/394, 395, 401, 402; 292/207, 241

[56] References Cited

U.S. PATENT DOCUMENTS

| | | | |
|---|---|---|---|
| 1,853,851 | 4/1932 | Dorey | 292/241 X |
| 1,960,922 | 5/1934 | Richard | 292/241 X |
| 2,156,635 | 5/1939 | Mascuch | 292/241 |
| 2,422,114 | 6/1947 | Matter | 292/241 X |
| 2,577,221 | 12/1951 | Winks et al. | 292/241 X |
| 2,762,473 | 9/1956 | Swerdlow | 49/395 |
| 2,970,718 | 2/1961 | Jennings | 292/241 X |
| 3,023,601 | 3/1962 | Luikart | 292/207 X |
| 3,189,951 | 6/1965 | Rosenfeld | 49/401 |
| 3,217,661 | 11/1965 | Kemp | 292/241 |
| 3,431,065 | 3/1969 | Schipanski | 422/116 |
| 3,455,059 | 7/1969 | Evans | |
| 3,560,038 | 2/1971 | Gunther | 292/241 |
| 3,574,529 | 4/1971 | Larro | 422/106 |
| 3,604,895 | 9/1971 | MacKay | 219/401 |
| 3,694,962 | 10/1972 | McDonald et al. | 49/177 |
| 4,095,829 | 6/1978 | Van Klompenburg | 292/241 |
| 4,193,818 | 3/1980 | Young et al. | 134/1 |
| 4,339,844 | 7/1982 | Shatters | 49/394 X |
| 4,495,673 | 1/1985 | Khan | 292/207 X |
| 4,622,902 | 11/1986 | Meller | 292/241 X |
| 4,674,777 | 6/1987 | Guelck | 292/241 X |

FOREIGN PATENT DOCUMENTS

| | | | |
|---|---|---|---|
| 260955 | 2/1965 | Australia | 49/394 |
| 511351 | 8/1939 | United Kingdom | 49/402 |

*Primary Examiner*—Peter M. Cuomo
*Assistant Examiner*—Jerry Redman
*Attorney, Agent, or Firm*—Trask, Britt & Rossa

[57] ABSTRACT

Hinge and latching structures associated with a door for a pressure vessel provides a tight and competent seal when the door is in sealed relationship with the opening of the vessel. The latching structure includes coupling structures which provide increased clamping engagement of the door in response to any increased pressure differential developed across the door.

19 Claims, 8 Drawing Sheets

CLOSURE FOR DOORS USED WITH SMALL AND MEDIUM SIZED PRESSURE VESSELS

BACKGROUND OF THE INVENTION

1. Field

This invention relates generally to pressurized vessels, such as sterilizers. Specifically, this invention is directed to a class of sterilizers which are of modest size and have non-circular doors. The invention provides a clamping force which keeps the door in sealing relationship with the sterilizer in response to an increase in pressure differential across the door.

2. State of the Art

Sterilizers and similar pressurized vessels are well-known. Generally, sterilizers comprise an outer housing which contains a chamber. The chamber has an opening through which items are placed for sterilization. Associated apparatus and controls provide for the exposure of those items within the chamber to sterilants under sterilizing conditions, often at elevated pressure. It is common for a partial vacuum to exist within the chamber during a portion of an operating cycle. A door is attached to the outer housing, and is positioned to cover the chamber opening. Sterilizer doors are commonly designed to effect a pressure seal, using a resilient gasket which forms an interface between the door and the opening of the sterilizer chamber. Contact between the door and the gasket produces an initial seal of the chamber. Mechanical or pneumatic means may be arranged to either expand or compress the gasket, thereby to enhance the seal.

Sterilizers which are provided with round doors are efficiently sealed by latching mechanisms which do not work well with rectangular doors. Certain sterilizers are provided with doors having non-circular, e.g., rectangular shapes. The shape of the door is of less consequence to large capacity sterilizers, because they typically include massive structural means for securing the door in place against the gasket while the sterilizer is in operation. Such massive structures are not practical for use with the rectangular doors of sterilizers of moderate size, e.g. less than two cubic feet. The doors of these moderately sized sterilizers are typically provided with means such as sliding bolts and hook and latch devices.

Closure mechanisms currently used in association with doors provided for moderately sized sterilizers (e.g., sterilizers requiring doors having a width of from about six inches to about twelve inches) often fail to provide adequate sealing of the chamber during pressurization of the sterilizer. Further, door closure mechanisms currently in use with smaller sized sterilizers provide inadequate assurance that an even and competent seal between the chamber and the door will be maintained during pressurization of the sterilizer.

Thus, there remains a need for a closure mechanism capable of effecting an adequate and reliable seal for moderately sized pressure chambers or non-circular doors. There is also a need for such a mechanism which avoids the massive and complex structural arrangements currently in use with larger chambers.

SUMMARY OF THE INVENTION

According to the present invention, a door is provided with a closure mechanism, specifically mounting and latching devices, structured to provide increased clamping engagement between the door and a pressurized vessel in response to the amount of pressure existing in the pressurized vessel during operation. The mounting and latching devices provide variable adjustment of the door in association with a pressurized vessel to assure an adequate pressure seal. While the invention is applicable to pressurized vessels generally, this disclosure focusses on use of the invention with sterilizers as an exemplar. The sterilizer will generally comprise a housing containing a sterilization chamber and apparatus for introducing sterilants into that chamber. The chamber is generally sized to receive a particular class of items, such as medical equipment, for sterilization. Structural members associated with the housing define an opening to the chamber. A resilient gasket is conventionally positioned to surround the opening to the chamber. The gasket may be carried by the door, but more generally is attached to a structural flange at the opening of the chamber. The door of this invention is mounted to the housing in pressure sealing relationship by special hinge and latch structures, respectively.

The closure mechanism of this invention may be adapted to doors of various size and shape, but is particularly advantageous when applied to non-circular doors for moderately sized vessels. The hinge portion of the closure mechanism of this invention is configured to secure the door in registration with the structural members defining the opening to the chamber. It is further configured to assure that when the door is in registration with the opening to the chamber, the door is securely positioned between structural elements of the hinge and corresponding structural elements associated with the sterilizer housing. Linkage elements of the hinge provide for floating positioning of the door relative to the gasket surrounding the chamber opening. By "floating positioning" is meant that the door is free to move slightly in a plane transverse the axes of the linkage elements so that the seal between the door and the opening is evenly compressed about the entire perimeter of the opening.

The closure mechanism of this invention also includes special latch structure for securing the door in a closed position. The latch structure includes cooperating coupling elements which effect increased latching engagement in response to a pressure differential across the door. An increase in clamping force between the coupling elements of the latch thus occurs when positive pressure is applied to the chamber.

The hinge structure and latch structure are positioned on the door along opposite edges of the door. Therefore, when the door is closed and the chamber is subjected to positive pressure, one edge of the door is forced outwardly against structural elements of the hinge and the opposite edge of the door is forced outwardly against structural elements of the latch.

The mechanism of the invention may be used with doors of sterilizers which position a gasket within a gasket groove surrounding the chamber opening. Channels formed in association with the gasket groove allow a transfer to the gasket of pressure generated within the chamber. A particularly tight seal is thereby provided between the door and the chamber because pressure transferred to the gasket in this way forces the gasket outwardly against the interfacing surface of the door opposite the groove. The closure mechanism reacts to the increased force applied to the door by increased clamping action.

When negative pressure is applied to the chamber, the door is urged inwardly against the chamber opening and is thereby brought into snug registration with the gasket surrounding the chamber. Under negative pressure, the coupling elements of the latch provide engagement with the latch structure to secure the door in position by locking the door handle.

The hinge and latch structures of the present invention are particularly adapted to provide a structurally competent and economically practical closure mechanism for small to medium-sized non-circular doors (e.g. about 100 to about 124 square inches).

BRIEF DESCRIPTION OF THE DRAWINGS

In the drawings, which illustrate what is currently considered to be the best mode for carrying out the invention.

DESCRIPTION OF THE ILLUSTRATED EMBODIMENT

Figure 1:
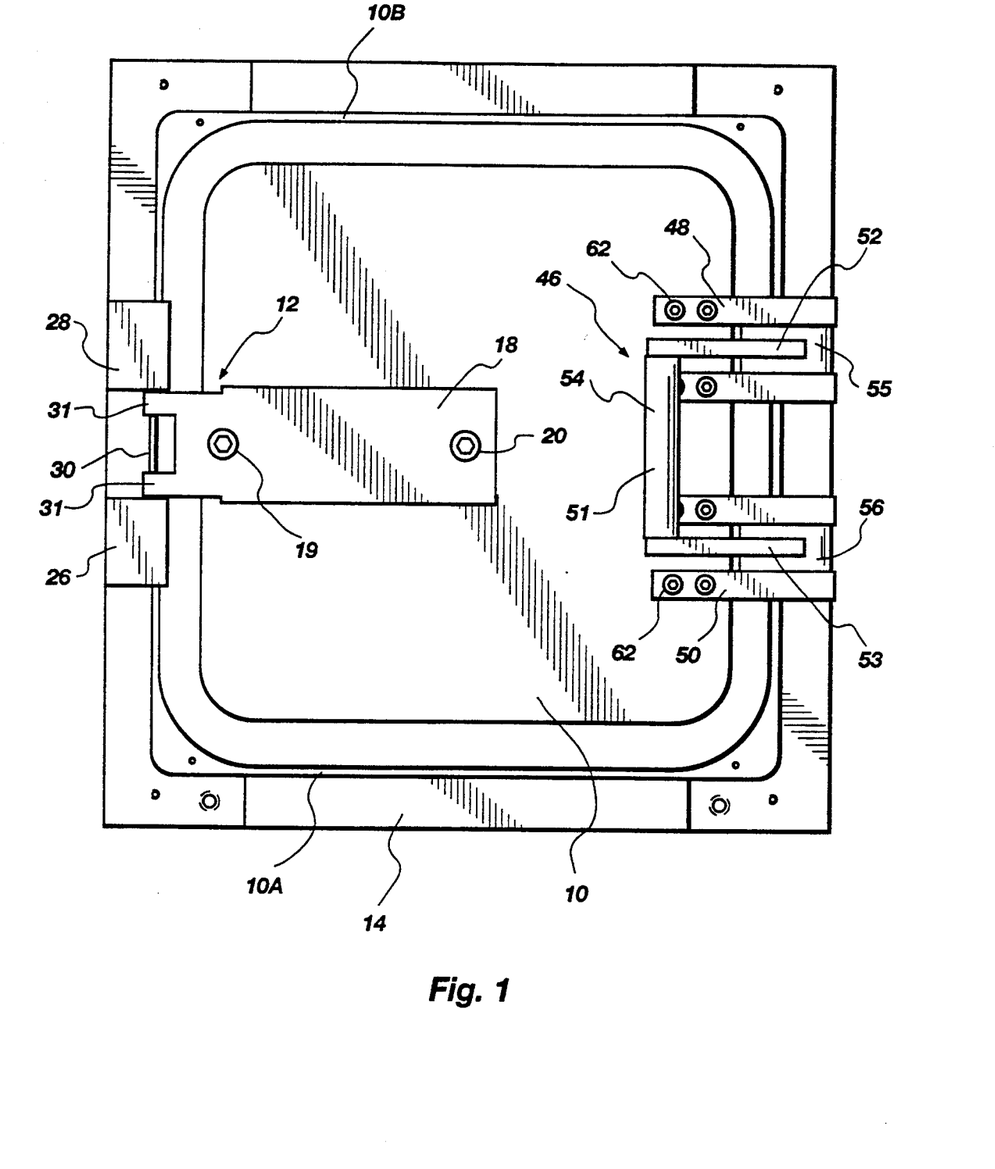
FIG. 1 is a view in front elevation of a sterilizer provided with a door fitted with typical hinge and latch structures of the invention.
Figure 6:
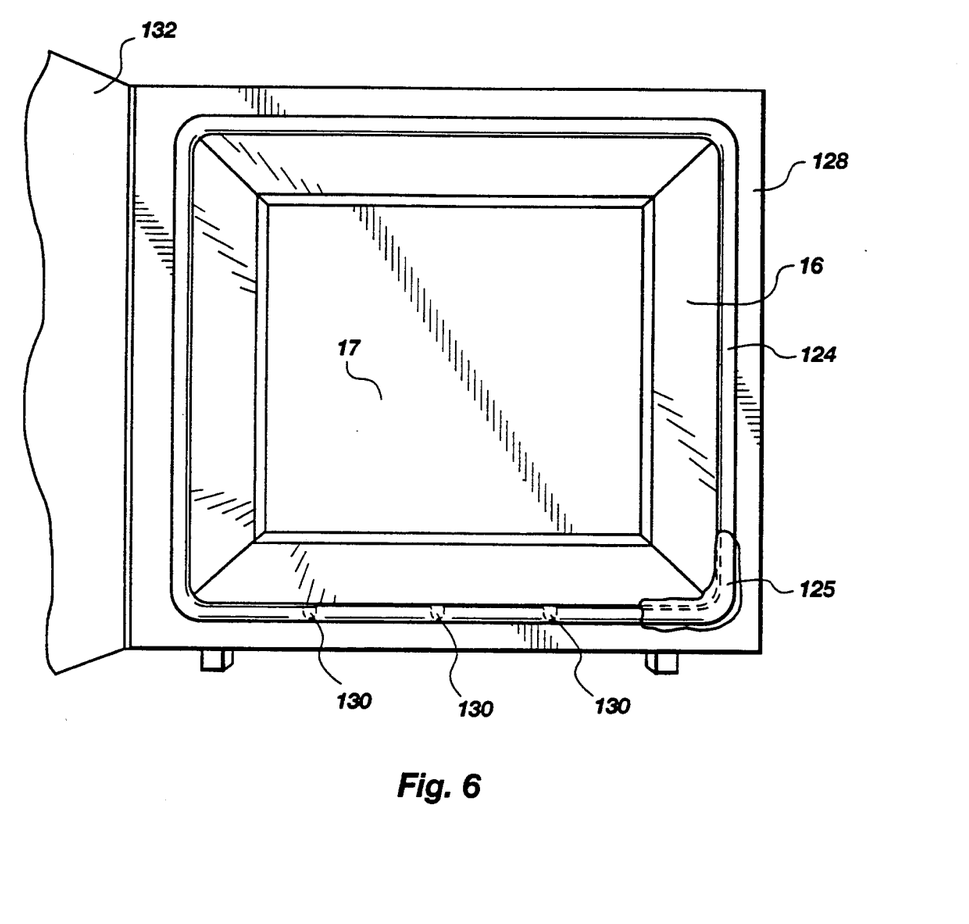
FIG. 6 is a fragmentary perspective view similar to FIG. 1 with the door opened to show the sterilizer chamber opening.
Figure 7:
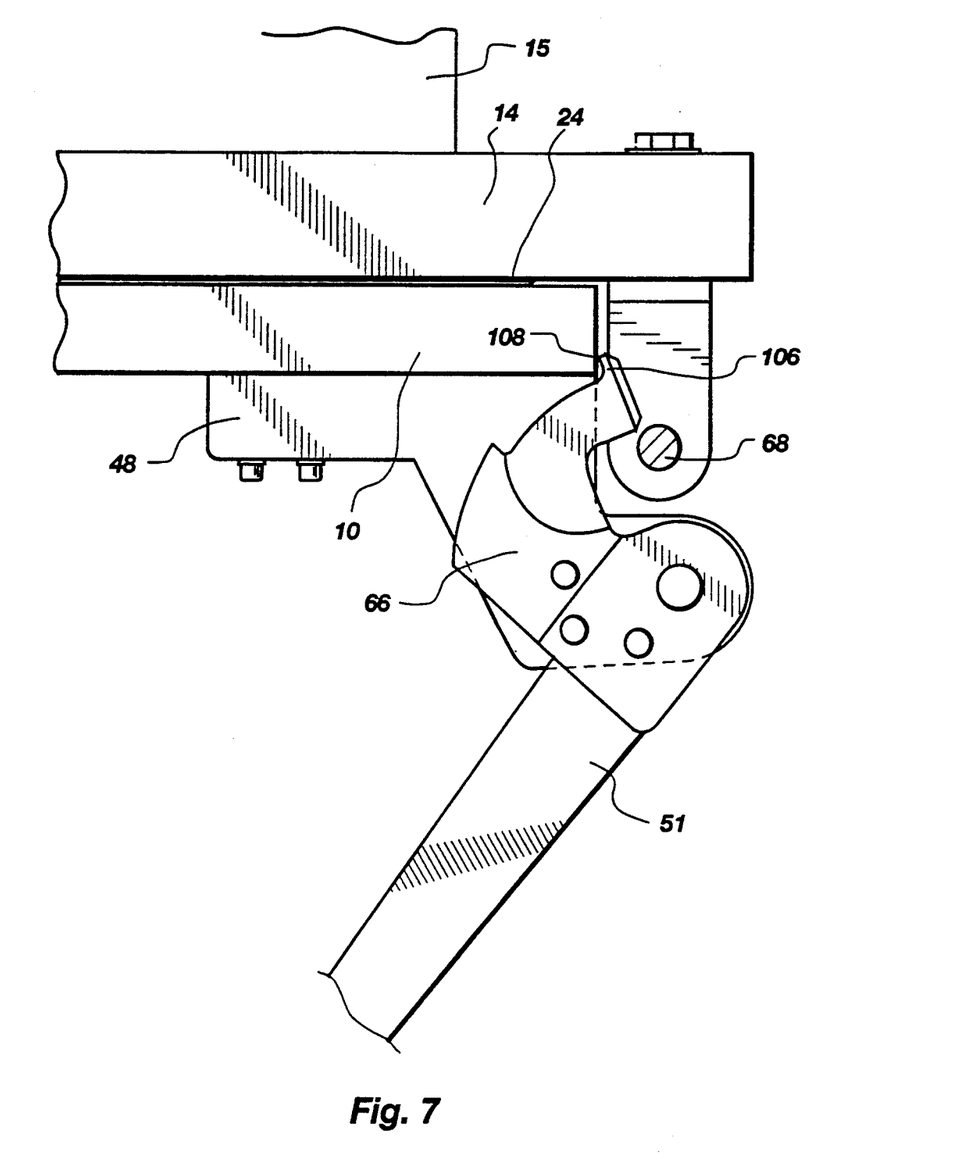
FIG. 7 is an enlarged fragmentary plan view of the latch of FIG. 2, rotated 90° clockwise with respect to FIG. 2, showing the handle and hook in an unlatched position.
Figure 8:
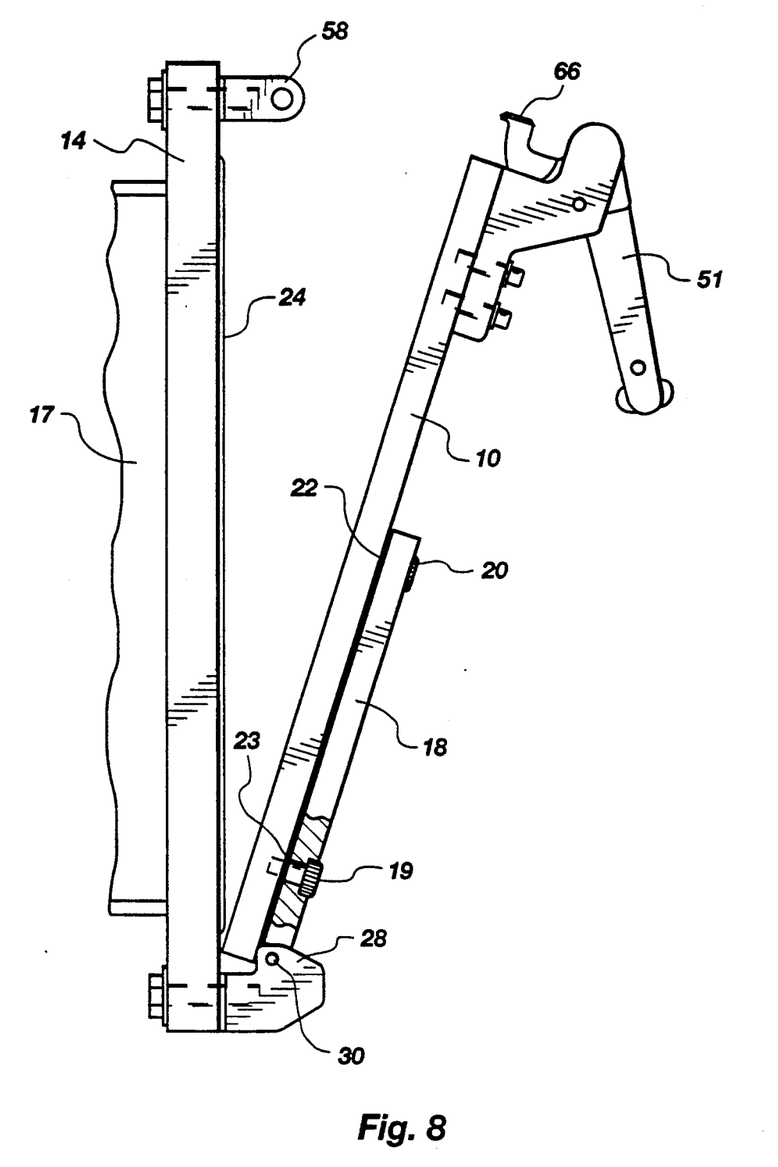
FIG. 8 is an enlarged fragmentary plan view, in partial section, of the sterilizer and door when the door is open.

As illustrated by FIG. 1, a door 10 is attached by a hinge structure, designated generally 12, to a flange plate 14, which constitutes a structural component of a sterilizer housing 15 (FIG. 2), and defines an opening 16 (FIG. 6) to a sterilization chamber 17 (FIG. 6).

Figure 2:
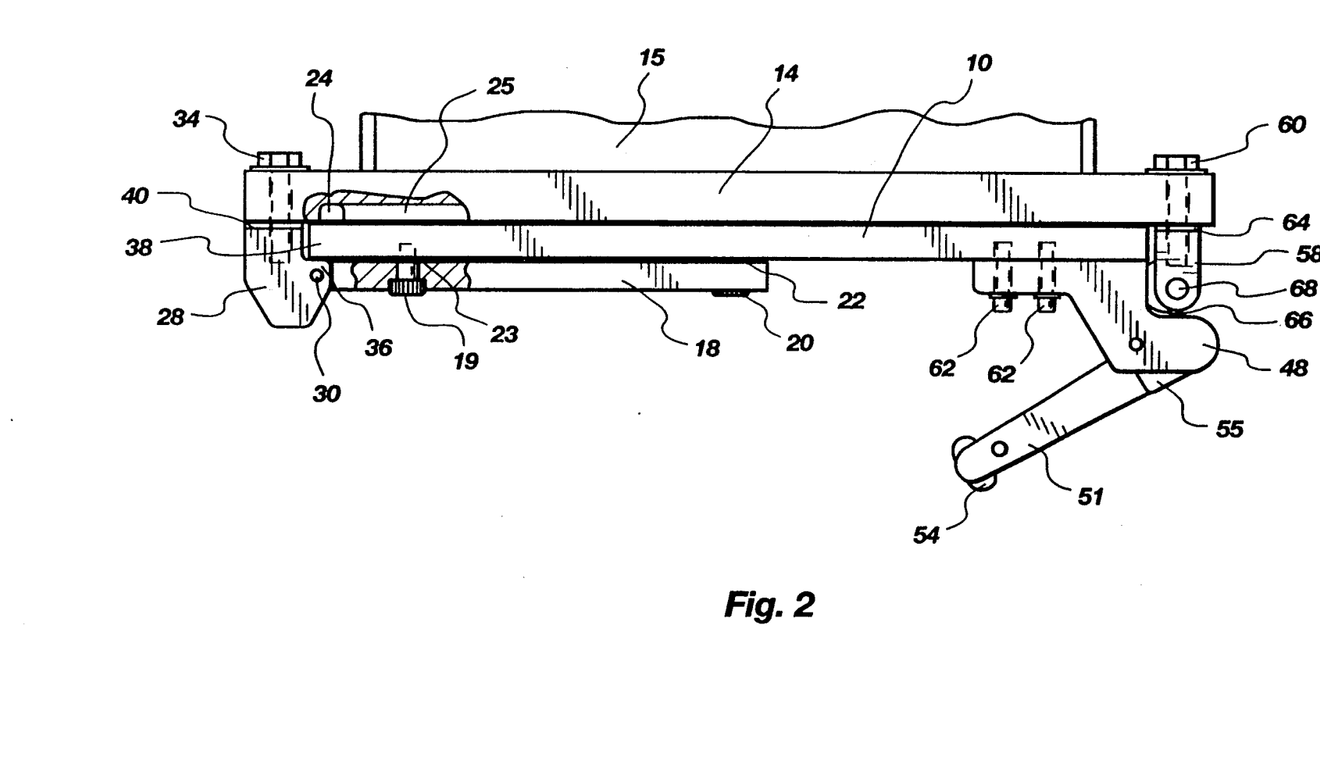
FIG. 2 is a fragmentary plan view, in partial section, of the sterilizer and door shown in FIG. 1 rotated 90° with respect to FIG. 1.

The hinge structure 12 includes a hinge plate 18 attached to the door 10 by at least two restraining fasteners, such as the shoulder bolts 19, 20 illustrated. The hinge plate 18 is located approximately midway between the bottom edge 10A and the top edge 10B of the door 10. Compression washers 22, 23 are positioned between the hinge plate 18 and the door 10, as shown by FIG. 2. The use of compression washers 22, 23 in connection with bolts 19, 20 to attach the hinge plate 18 to the door 10 allows the door to "float," or move slightly in a plane transverse the longitudinal axes of the bolts 19 and 20. The ability of the door 10 to "float" slightly allows the door to align to the gasket 24 surrounding the opening 25 to the sterilizer chamber as the door 10 is being brought into registration with the gasket 24.

The hinge structure 12 also includes hinge lugs 26, 28 which are attached to the flange plate 14 of the sterilizer. The hinge plate 18 articulates with the hinge lugs 26, 28 by means of a hinge pin 30 which interconnects between the hinge lugs 26, 28. The hinge pin 30 is rotatably positioned within a channel 31 formed at one end of the hinge plate 18. As more clearly illustrated by FIG. 2, each hinge lug 28 is connected to the flange plate 14 of the sterilizer 15 by connection means such as the bolt 34.

The hinge lugs 26, 28 are configured with a projecting edge 36. The hinge plate 18 is positioned on the door 10 so that the door rotates about the focus produced by the axis of the hinge pin 30. The hinge pin 30 is positioned so that the door 10 does not interfere with either the projecting edge 36 of the hinge lugs 26, 28 or the flange plate 14 and the gasket 24 as the door rotates to a closed position. When closed, the edge 38 of the door 10 becomes positioned between the projecting edge 36 of the hinge lugs 26, 28 and the gasket 24 mounted on the flange plate 14 of the sterilizer 15.

The distance between the projecting edge 36 of the hinge lugs 26, 28 and the flange plate 14 can be varied by adjustment means associated with the hinge lugs 26, 28. Such adjustment means is desirably a shim 40 positioned between the hinge lug 28 and the flange plate 14, as shown by FIG. 2. The area between the projecting edge 36 and the flange plate 14 provides a space which receives the edge 38 of the door 10 when the door 10 is closed. A proper distance between the projecting edge 36 and the door is necessary to assure a snug fit of the door 10 therebetween.

A latch structure, designated generally 46 in FIG. 1, is associated with the door 10, and is positioned on the edge of the door opposite the placement of the hinge plate 18. The latch structure includes door lugs 48, 50 which are attached to the door 10, and a handle 51. In a preferred embodiment, the handle 51 is U-shaped and has two elongated leg members 52, 53 with an interconnecting rod 54 for grasping. Each leg member 52, 53 is positioned between a clasp bracket 55, 56 and is secured to the clasp bracket 55, 56. Each clasp bracket 55, 56 is secured to a door lug 48, 50.

The latch structure also includes latch lugs 58 which are attached to the flange plate 14 of the sterilizer (FIG. 2). Each latch lug 58 is attached to the flange plate 14 of the sterilizer 15 by bolts 60. Each door lug 48, 50 is attached to the front face of the door 10 by a bolt 62. The initial amount of pressure applied by the door 10 against the gasket 24 can be selected by adjustment of the position of the latch lugs 58 relative to the flange plate 14. Preferably, such adjustment is effected by placement of shims 64 between the latch lugs 58 and the flange plate 14. Each latch lug 58 is positioned on the flange plate 14 opposite a door lug 48 and aligns with a hook 66 which is machined to each clasp bracket 55, 56. The hook 66 engages a latch pin 68 connected to the latch lug 58.

Figure 3:
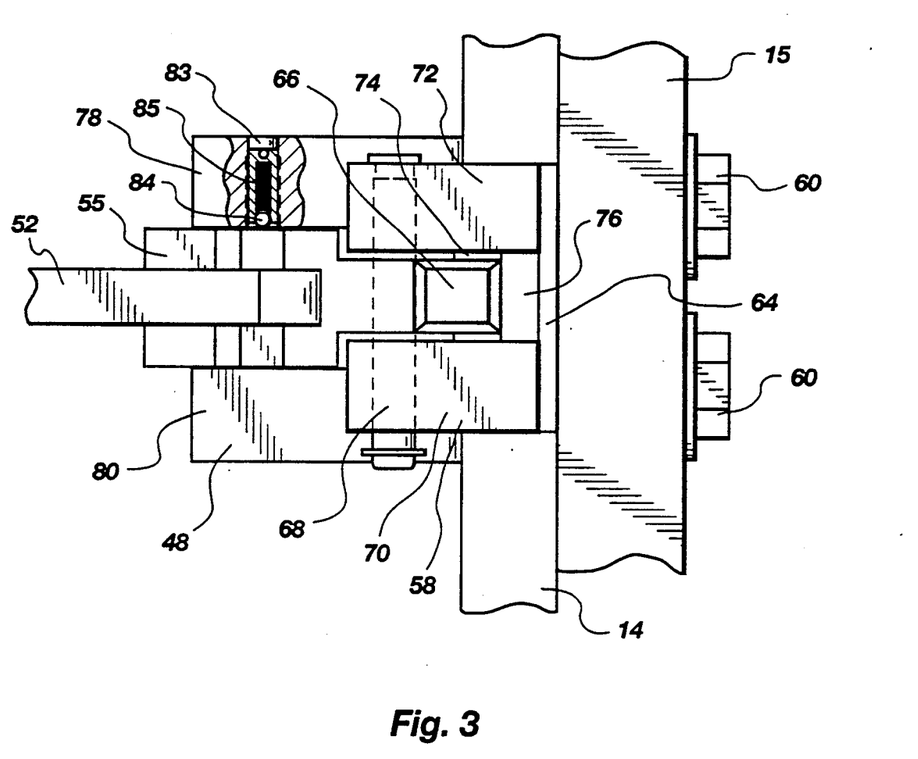
FIG. 3 is an enlarged fragmentary view of a portion of the latch structure of FIG. 2 rotated 90° with respect to FIG. 2.

Referring to FIG. 3, in a preferred embodiment, each latch lug 58 includes spaced apart and substantially parallel bearings 70, 72. The latch pin 68 is interconnected between the bearings 70, 72 and is able to rotate freely. A space 74 is formed between the bearings 70, 72, the latch pin 68 and a step 76 which is machined to the latch lug 58. The hook 66 fits within the space 74 and engages the latch pin 68.

Figure 4:
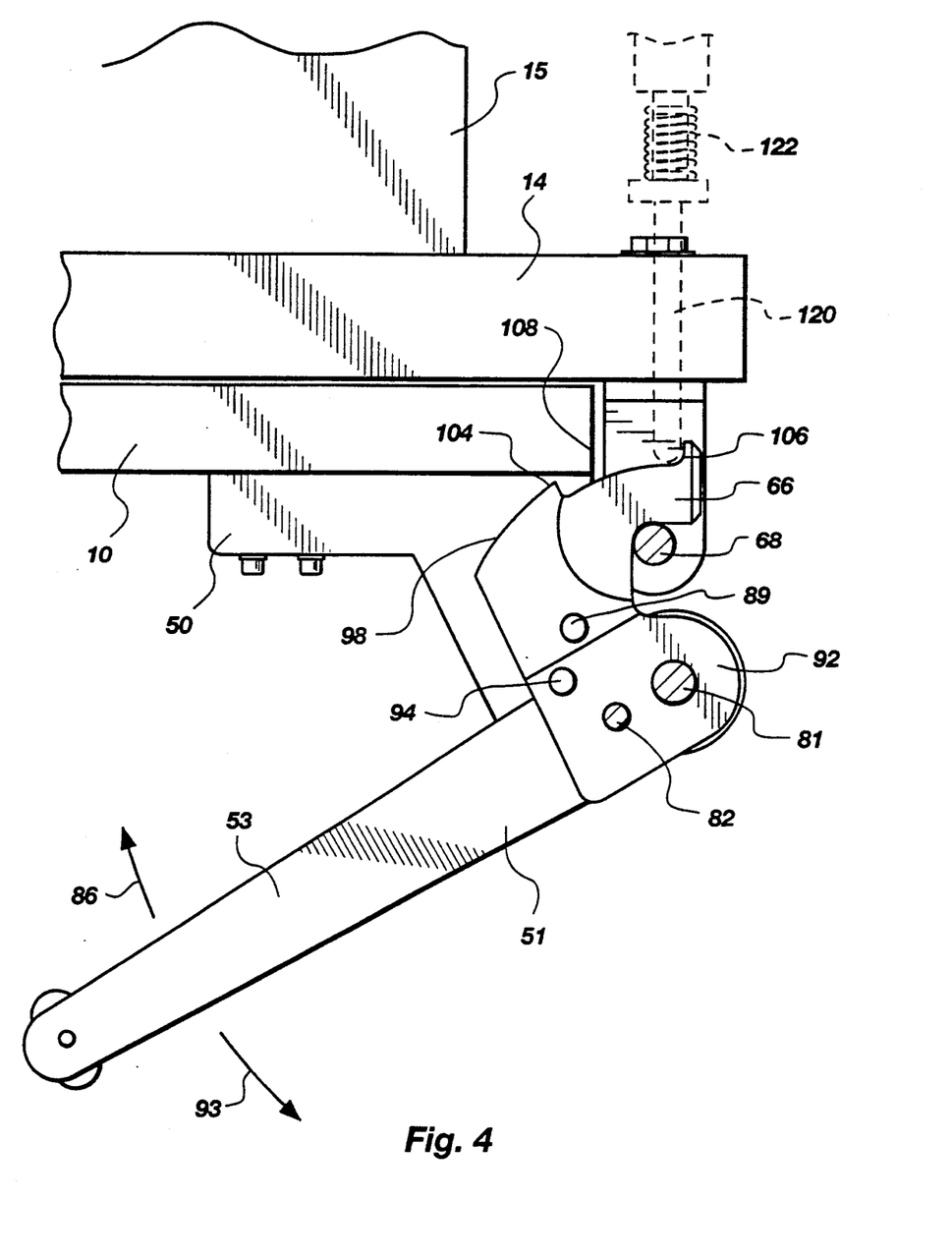
FIG. 4 is an enlarged fragmentary plan view of the latch of FIG. 2, rotated 90° clockwise with respect to FIG. 2, showing the handle and hook in latched condition with certain details being shown in phantom lines.

Each door lug 48 includes an upper portion 78 and a lower portion 80 which are spaced apart. The clasp bracket 55 is positioned between the upper portion 78 and lower portion 80 of the door lug 48 and is held in place by a rotatable locating pin 81 (FIG. 4). The leg member 52 of the handle 51 is positioned within the clasp bracket 55 and is secured thereto by a locking pin 82 (FIG. 4).

Means for adjusting the clasp bracket 55, and thus the hook 66, in a vertical plane is provided so that the hook 66 may fit conveniently within space 74. An exemplary such means for adjusting the clasp bracket 55 is a ball plunger 83 located within the door lug 48, shown in FIG. 3 as located in the upper portion 78. The ball 84 of the plunger 83 articulates with the clasp bracket 55 and the ball, under pressure supplied by the spring 85 of the plunger 83, provides a small amount of space between the door lug 48 and the clasp bracket 55. Therefore, as the handle 52 is rotated to engage the hook 66 about the latch pin 68, the hook 66 moves slightly until it is properly positioned to fit into space 74.

Referring to FIG. 4, when the handle 51 is rotated in direction 86 toward the door 10, thereby engaging hook 66 with the latch pin 68, the ball 84 of the plunger 83 drops into a depression 89 formed in the clasp bracket 55 and is then closed. When the handle 51 is rotated in direction 93 away from the door 10 to disengage the hook 66 from the latch pin 68, the ball 84 of the plunger 83 rolls across the surface of the clasp bracket 55 and comes to rest in a second depression 94 formed in the clasp bracket 55.

The leg member 53 is secured to the clasp bracket 55 by a locking pin 82. The clasp bracket 55 is attached to the door lug 50 by a locating pin 81 which allows free rotation of the leg member 53 and clasp bracket 55 about the axis of the locating pin 81. Rotation of the leg member 53 and clasp bracket 55 are limited, however, by the configuration of the clasp bracket 55. That is, the clasp bracket 55 has an arcuately shaped edge 98 terminating with an angled point 104 which, when the leg member 53 is rotated in direction 86, strikes the door 10 limiting further rotation in that direction. The hook 66 is also configured with a projecting lip 106 which, when the handle 51 is rotated in direction 93, strikes the edge 108 of the door 10 limiting further rotation in that direction.

Figure 5:
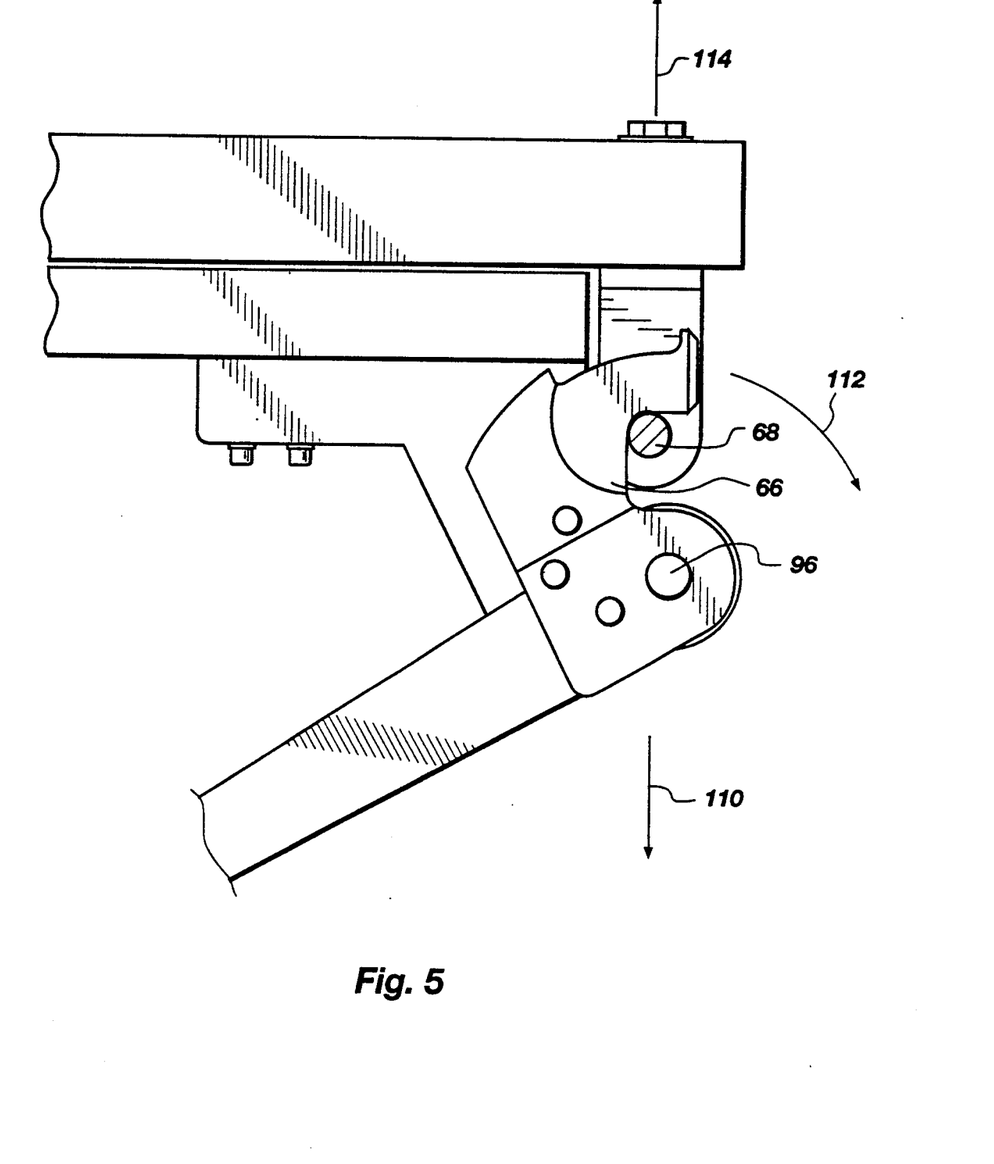
FIG. 5 is a simplified partial view of the latch shown in FIG. 4, illustrating various vector forces.

In operation, when the hooks 66 are engaged about the latch pins 68 and the handle 51 is in the closed position (pushed toward the door 10 in direction 86) pressurization of the sterilizer is begun. As positive pressure increases within the chamber 17, the door 10 is forced outwardly. The edge 38 of the door 10 near the hinge 12 is forced outwardly against the projecting lip 36 of the hinge lugs 28, and the hooks 66 are forced against the latch pins 68. As illustrated by FIG. 5, a moment is created by the offset loading condition with respect to the latch pins 68 and the locating pins 81. That is, an outward force, in direction 110, and reaction force in opposing direction 114, will cause the hook 66 to rotate in direction 112 about the locating pin 81 thereby locking the door 10 in position.

When the sterilizer is operated under negative pressure, the door is urged inwardly against the gasket 24 surrounding the chamber opening 25. The force of the door against the gasket assures a tight seal. The projecting lip 106 on the hook 66 engages with the step 76 of the latch lug 58 and restricts rotation of the hook 66 thereby locking the door 10 in position. Under positive pressure, the moment created by pressure exerted on the door increases as the pressure differential across the door 10 increases. Therefore, the handle becomes increasingly difficult to rotate, and eventually rotation of the handle is completely prohibited due to increased moment in direction 112 effected in response to the elevated pressure differential.

As suggested in broken line by FIG. 4, a security latch 120 which extends through the flange plate 14 of the sterilizer and impinges the extended lip 106 of the hook 66 may be added as a component of the latch structure. The security latch 120 assists in maintaining the door in latched condition, particularly during a power failure. The security latch 120 may be driven by electromechanical means, such as an electrical solenoid 122.

The latch structure of the present invention is advantageous when used with doors provided in connection with sterilizers which have a gasket 124 positioned within a gasket groove 125 surrounding the chamber opening 16 of the sterilizer 128, as illustrated by FIG. 6. The gasket groove 125 has formed therein a number of channels 130 which allow pressure generated by the heated sterilant to be transferred to the gasket 124. That is, pressure is transferred behind the gasket 124 forcing the gasket 124 outwardly against the inner face of the door 132 which interfaces with the gasket 124. A tight seal between the gasket 124 and door 132 is thus formed at all times.

Reference herein to specific details of the illustrated embodiments is not intended to limit the scope of the claims which themselves recite those features regarded as important to the invention.

We claim:

1. Structure for securing a door in sealing relationship with the opening to a chamber of a pressurized vessel comprising:
   hinge structure connecting a first edge of said door to a corresponding first side of said opening through linkage structure providing a surface parallel to and opposing said opening which contacts said first edge to restrain movement of said door in a direction transverse the plane of said opening; and
   latch structure releasably connecting a second edge of said door to a corresponding second side of said opening through a mechanism which has an engagement condition in which first and second structural components are coupled to effect a latching force to hold said door in position, said first and second components being mutually adapted so that said latching force increases in response to increasing differentials in pressure between the inside and outside of said pressurized vessel.

2. Structure according to claim 1 in which said hinge structure includes a hinge plate secured to said first edge of said door and hinge lugs secured to said first side of said opening, said hinge plate articulating with said hinge lugs, and in which said first and second structural components are a hook associated with said second edge of said door and a latch pin associated with said second side of said opening, respectively.

3. Structure according to claim 2 further comprising first adjustment means associated with said hinge lugs providing increasing contact between said door in sealing relationship with said opening as said pressure increases within said pressurized vessel, and further comprising second adjustment means associated with said hinge plate providing movement of said door in a plane parallel to said opening.

4. Structure according to claim 3 wherein said hook is secured to a handle and wherein said hook is structured with an extending lip and an edge which alternatively contact said second side of said door to restrict rotation of said hook.

5. Structure according to claim 3 wherein said second adjustment means comprises shoulder bolts and spring washers.

6. Structure according to claim 5 further comprising fourth adjustment means associated with said latch structure providing movement between said hook and said latch pin.

7. Structure according to claim 6 wherein said fourth adjustment means comprises a ball plunger.

8. Structure according to claim 3 wherein said hinge lugs include a projecting edge for limiting movement of said first edge when said door is in said sealing relationship with said opening.

9. Structure according to claim 3 further comprising third adjustment means associated with said latch structure providing increasing contact between said door in sealing relationship with said opening.

10. Structure according to claim 9 wherein said first adjustment means and said third adjustment means comprise shims.

11. A closure for the door of a pressurized vessel of the type having an outer housing, a chamber formed within the housing, and an opening to said chamber comprising:
hinge structure interconnected between said door and said outer housing providing movement of said door to effect obstruction of said opening to said chamber by said door, said hinge structure further providing a surface parallel to and opposite said opening which is contactable by said door to restrain movement of said door in a direction transverse the plane of said opening;
first latch structure secured to said outer housing;
second latch structure secured to said door, said second latch structure being adapted to engage with said first latch structure to effect securement of said door against said opening, said first and second latch structure being configured to provide a latching force therebetween which increases in response to increasing differentials in pressure between the inside and outside of said pressurized vessel.

12. The closure according to claim 11 wherein said hinge structure includes a hinge plate secured to said door, a hinge lug secured to said outer housing, and a hinge pin connected to said hinge lug and rotatably engaged with said hinge plate so that said hinge plate and said door may rotate in relation to said hinge lug.

13. The closure according to claim 12 wherein said first latch structure comprises a latch lug and latch pin, and said second latch structure comprises a hook rotatably secured to a door lug, said hook structured to come in engaging contact with said latch pin.

14. The closure according to claim 13 wherein said latch lug is provided with first adjustment structure and wherein said hinge lug is provided with second adjustment structure, said first and second adjustment structure providing adjustment of said door relative to said opening when said door is positioned to obstruct said opening.

15. The closure according to claim 12 wherein said hinge plate is secured to said door by an adjustable mount, and wherein said hinge lug has a projecting rim.

16. The closure according to claim 15 wherein said hook is configured with a projecting lip and an edge which alternatively come in contact with said door for restricting movement of said hook.

17. A closure for a pressurized vessel of the type having a housing with a chamber formed therein for receipt of items for sterilization, an opening into said chamber, a gasket positioned within a gasket groove formed around said opening, said groove having holes therein which allow sterilant vapor to enter behind said gasket comprising:
a door;
a hinge plate secured to said door by bolts and spring washers, said spring washers being disposed between said hinge plate and said door;
a hinge lug secured to a pressurized vessel housing, said hinge lug having a projecting edge;
a hinge pin connected to said hinge lug and rotatably engaged with said hinge plate so that said hinge plate and said door may rotate in relation to said hinge lug;
first adjustment means associated with said hinge lug for adjusting the distance between said projecting edge and said pressurized vessel housing;
latching structure for securing said door to said pressurized vessel housing comprising: a door lug secured to said door,
a handle rotatably secured to said door lug,
a latch lug secured to said pressurized vessel housing,
second adjustment means associated with said latch lug for adjusting the distance between said latch lug and said pressurized vessel housing,
a latch pin rotatably mounted to said latch lug, and
a clasp bracket secured to said handle, said clasp bracket having a hook with structures to restrict over-rotation of said hook about said latch pin.

18. The closure according to claim 17 in which said hook structures include an extending lip and an arcuate edge which alternatively contact said door to restrict movement of the handle.

19. The closure according to claim 17 in which said first adjustment means and said second adjustment means is a shim.

* * * * *